(12) United States Patent
Benjey

(10) Patent No.: US 6,405,766 B1
(45) Date of Patent: Jun. 18, 2002

(54) NOISE DAMPENED FLOAT TYPE FUEL VAPOR VENT VALVE

(75) Inventor: Robert P. Benjey, Dexter, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 09/726,234

(22) Filed: Nov. 29, 2000

(51) Int. Cl.$^7$ ................................................ F16K 17/00
(52) U.S. Cl. ........................... 141/198; 141/7; 141/52; 141/59; 141/303; 137/43; 137/202
(58) Field of Search .......................... 141/5, 7, 44–46, 141/52, 53, 59, 198, 303; 137/43, 202, 587

(56) References Cited

U.S. PATENT DOCUMENTS 3,888,274 A * 6/1975 Weston ...................... 137/202
5,860,458 A * 1/1999 Benjey et al. ................ 141/59

* cited by examiner

Primary Examiner—J. Casimer Jacyna
(74) Attorney, Agent, or Firm—Roger A. Johnston

(57) ABSTRACT

A float operated fuel tank vapor vent valve having a reduced diameter portion on the bottom of the float which forms a tapered surface. The tapered surface contacts a plurality of spaced resilient fingers when the float drops suddenly; and the float motion is thus arrested silently by deflection of the resilient fingers.

7 Claims, 2 Drawing Sheets

NOISE DAMPENED FLOAT TYPE FUEL VAPOR VENT VALVE

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The present invention relates to valves disposed on a vehicle fuel tank for controlling the flow of fuel vapor from the vapor dome within the tank to a reservoir or storage canister for storing fuel vapor during periods of engine shutdown.

Fuel tank vapor vent valves are typically mounted through an access hole in the top of the fuel tank and sealed thereon and have a float in the valve which is calibrated to close the vent orifice in the valve when the liquid fuel level reaches a predetermined level in the tank.

As the fuel level is lowered by withdrawal of fuel from the tank for engine operation, a float is permitted to drop a desired amount to open the vent passage. In this condition, sloshing of the fuel due to vehicle motion can cause the float to be moved downward with a sufficient velocity to impact the limit stop or bottom of the float casing thereby producing sounds which are perceptible to the vehicle occupants. The noise from the rattling or bouncing of the float against its lower limit stop is considered to be annoying and unacceptable.

Attempts to provide frictional dampening of the movement of the float have generally been unsuccessful in that the buoyancy forces acting on the float are relatively low; and, any friction force on the float results in delayed closing of the float and improper operation of the valve.

Thus, it has long been desired to find a way or means for quieting the movement of the float in a fuel tank vapor valve without interfering with the operation of the valve or significantly increasing the manufacturing cost of the valve.

BRIEF SUMMARY OF THE INVENTION

The present invention provides a float type valve for controlling venting the fuel vapor in a fuel tank. The valve of the present invention addresses the above-described problem of silencing the float from rattling or hitting against its lower limit stop due to fuel sloshing or vehicle motion when the fuel level is sufficiently low to permit the float to drop to a fully open position.

The valve of the present invention has the limit stop provided with resilient fingers which are engaged by a tapered surface on the float. As the float drops, it contacts and resiliently deflects the fingers, which deflection decelerates the float and provides the limit stop. This construction results in an increased time for decelerating the float for a given velocity and thus reduces or eliminates any noise which would be generated by the float otherwise suddenly engaging its limit stop.

DETAILED DESCRIPTION OF THE INVENTION

Figure 1:
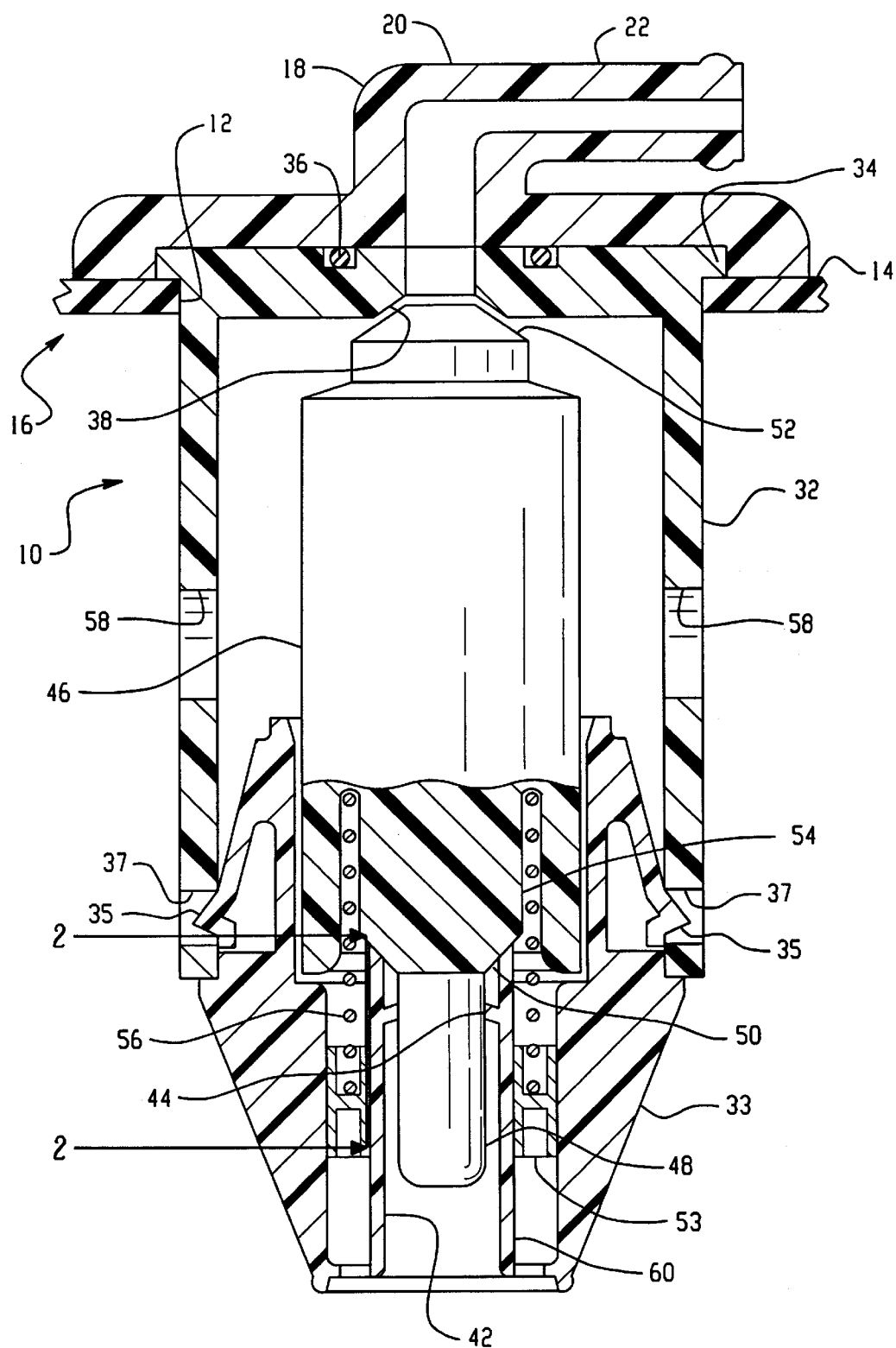
FIG. 1 is a cross-section of the valve of the present invention installed in the upper wall of a fuel tank.
Figure 3:
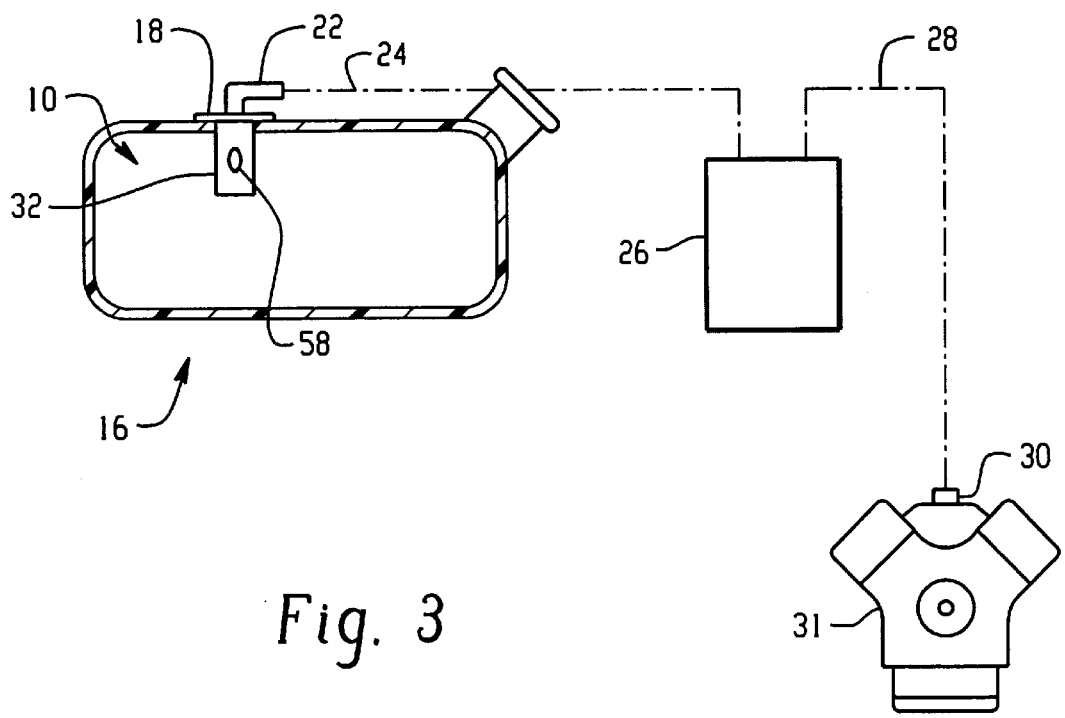

Referring to FIGS. 1 and 3, the valve assembly of the present invention is indicated generally at 10 and is installed through an access opening 12 formed in the top wall 14 of a fuel tank indicated generally at 16 and retained thereon by a cover or retaining member 18 which may be attached to the tank either by fasteners or preferably weldment. Member 18 includes a vent passage 20 which communicates through a preferably integrally formed fitting 22 with a conduit 24 which is connected thereto and connected to a fuel storage reservoir 26 as indicated by dashed outline in FIG. 3. Reservoir 26 has another conduit 28 connecting the reservoir to the air inlet 30 of a motor vehicle engine 31.

Referring to FIG. 1, the valve 10 includes a housing 32 connected to a body 33 by snap locking housing slots 37 over tabs 35 provided on the body 33 having the exterior thereof adapted to be received through the tank aperture 12 in closely fitting arrangement. The upper end of the valve body has an annular flange 34 formed thereon for registering on the upper surface of the tank about the access hole 12. The cover 18 is received over the flange 34 and the cover is sealed on the valve body by a suitable seal ring 36 or any other suitable expedient and is secured to the tank top 14, preferably by weldment.

The upper end of the housing 32 is closed and has formed therein an annular valve seat 38 which communicates with vent passage 20 in the cover.

A float 46 is disposed in body 33; and, the lower end of the float has a reduced diameter portion 48. The body 33 has an annular inner wall 42 which forms a guide bore and has an annular rib 44 formed thereabout for providing a guide surface for float portion 48.

Figure 2:
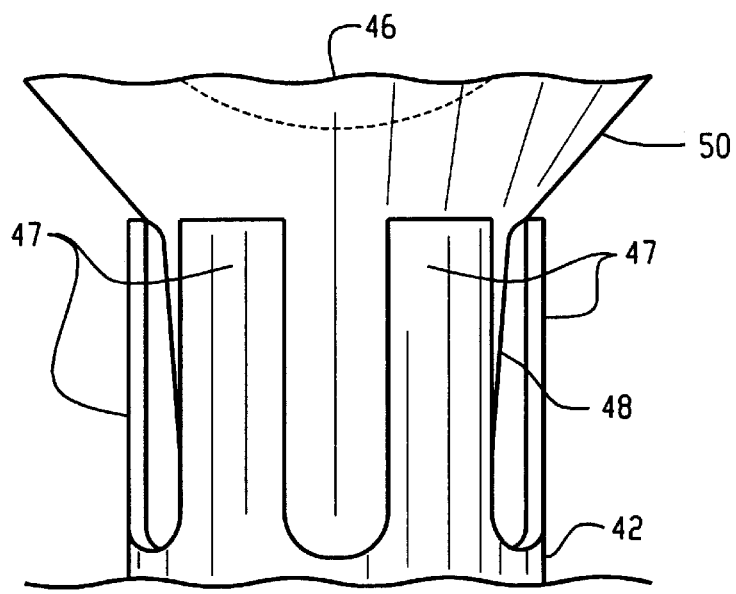
FIG. 2 is an enlarged section view taken along section-indicating lines 2—2 of FIG. 1; and, FIG. 3 is a pictorial representation of a system employing the valve of the present invention.

Referring to FIG. 2 the upper end of annular wall 42 is castellated to form a plurality of resilient axially extending fingers 47 circumferentially spaced about the annular wall 42 and which are radially resiliently deflectable. Float member 46 is thus slidably received in the housing 32. The float 46 has an annular axially tapered surface 50 formed between the diameter 48 and the upper portion 46, which tapered portion contacts the ends of fingers 47 when the float is lowered. The fingers 47 thus resiliently and silently arrest the downward motion of the float.

The upper end of the float 46 has a tapered pintle 52 formed thereon for sealing against valve seat 38 when the fuel level in the tank has reached a predetermined level and has raised the float.

A calibration plate 53 is provided in the bottom of the housing; and, a calibration spring 56 has the lower end thereof registered against plate 53 and the upper end registered in a groove 54 formed in the float and urges the float upwardly by an amount determined by the vertical location of calibration plate 53. Plate 53 is adjusted in an annular groove 60 formed in the body to provide a desired positioning of the pintle 52 of the float with respect to valve seat 38 such that the buoyant force of the liquid fuel in the tank at the predetermined level will cause the float pintle 52 to seat on the valve seat 38 closing vent passage 20.

Slots 58 are formed in the side of housing 32 thereof to insure entrance of the liquid fuel to the float chamber.

The present invention thus provides a float operated fuel vapor vent valve for a fuel tank which has the stop for the lower travel limit of the float provided with resilient surfaces to silently arrest the downward movement of the float, thereby preventing rattling and undesirable noise due to sloshing of the fuel in the tank or motion of the vehicle.

Although the invention has hereinabove been described with respect to the illustrated embodiments, it will be understood that the invention is capable of modification and variation and is limited only by the following claims.

What is claimed is:

1. An on-board refueling vapor recovery valve (ORVR) for use in a motor vehicle fuel tank comprising:
   (a) housing structure defining a float chamber with an outlet wherein a float disposed in said chamber is operative upon encountering a first predetermined level of liquid fuel in the fuel tank to move to a position closing said outlet with an upper end of said float and to move to a position opening said outlet when fuel level falls below said first level and when said float is moved to a position contacting said body with a lower end of said float upon fuel dropping below a second level lower than said first;
   (b) means for dampening movement of said float comprising resiliently deflectable portions of said housing structure; and,
   (c) means applying a force to bias said float in a direction toward said closed position.

2. The valve defined in claim 1, wherein said means for dampening comprises a plurality of resilient fingers disposed about said float, said fingers making contact with said float during said moving to said position contacting said body and said fingers are resiliently deflected by said float.

3. The valve defined in claim 1, wherein said means for dampening includes resiliently deflectable portions of said housing structure formed in said float chamber.

4. The valve defined in claim 1, wherein said means for dampening includes a plurality of resilient fingers disposed about said float and said float includes a tapered surface contacting said fingers during said moving.

5. A method of quieting an on-board vapor valve for use in a motor vehicle fuel tank comprising:
   (a) forming a float chamber in a valve body and disposing a float in said chamber and disposing the valve body on the fuel tank;
   (b) forming a fuel vapor outlet in said chamber and moving said float to close said outlet when fuel rises above a predetermined first level in the tank; and, moving said float away from said outlet when fuel falls below said first level and contacting said body with said float when fuel fills below a second level lower than said first;
   (c) forming a resiliently deflectable dampener in said body and contacting said dampener upon said float reaching said second level and absorbing at least a portion of the energy of float movement by deflection of said dampeners.

6. The method defined in claim 5, wherein said step of disposing a resilient dampener includes forming a plurality of resilient fingers in said float chamber and deflecting said fingers during said moving.

7. The method defined in claim 5, wherein said step of disposing a dampener includes forming a plurality of resilient fingers in said float chamber and forming a tapered surface on said float.

* * * * *